United States Patent
Dhar et al.

[19]

[11] Patent Number: 5,935,725
[45] Date of Patent: Aug. 10, 1999

[54] FLOW FACILITATOR FOR IMPROVING OPERATION OF A FUEL CELL

[75] Inventors: Hari P. Dhar; Krzysztof A. Lewinski, both of Brazos County, Tex.

[73] Assignee: BCS Technology, Bryan, Tex.

[21] Appl. No.: 08/896,816

[22] Filed: Jul. 18, 1997

[51] Int. Cl.[6] .................................................. H01M 8/04
[52] U.S. Cl. ................................ 429/12; 429/32; 429/38
[58] Field of Search ................................ 429/12, 14, 34, 429/13, 38, 39, 32; 427/115

[56] References Cited

U.S. PATENT DOCUMENTS

| | | | |
|---|---|---|---|
| 3,527,618 | 9/1970 | Bushnell | 429/12 |
| 3,532,549 | 10/1970 | Bradley et al. | 429/13 |
| 4,160,856 | 7/1979 | Warszawski | 429/14 |
| 4,769,296 | 9/1988 | Sterzel | 429/12 |

*Primary Examiner*—Anthony Skapars
*Attorney, Agent, or Firm*—Akin, Gump, Strauss, Hauer & Feld, LLP

[57] ABSTRACT

A fuel cell including an electrode assembly, a cell assembly mounted to the electrode assembly forming an anode and at least one cathode channel, and a flow facilitator located within each cathode channel. The flow facilitator functions as a wick during the operation of the fuel cell to drain fluid from the cathode channels. It also provides resistance to water vapor flow within the cathode channels, thereby increasing humidification of the fuel cell. Moreover, the flow facilitator increases residence time of oxidant within the cathode channels. The flow facilitator is preferably a thread made of any one or any combination of cotton, silk, fiberglass, nylon or polyester, and may be coated with polytetraflouroethylene. The flow facilitator may be a single element that is weaved in specific patterns through the cathode channels or it can include a plurality of elements, one element for each of the cathode channels. A fuel cell stack includes a plurality of fuel cells, each fuel cell formed by a bipolar plate, an electrode assembly with an electrolyte, and an anode channel. Each bipolar plate includes at least one cathode channel. The flow facilitator is weaved between and into a subset of the plurality of cathode channels.

21 Claims, 8 Drawing Sheets

FLOW FACILITATOR FOR IMPROVING OPERATION OF A FUEL CELL

FIELD OF THE INVENTION

The present invention relates to the field of power generation using fuel cell stacks, and more particularly to a method and apparatus for improving the flow of fuel and oxidant, draining condensed liquid, managing the humidity of the condensed liquid, and improving performance using a flow facilitator in a fuel cell stack.

DESCRIPTION OF THE RELATED ART

There are many different types of fuel cells for power generation using fuel and oxidants. Fuel cells are typically used as a source of primary power in remote areas where the usual sources of power are unavailable and where the service and maintenance of equipment are limited. Generally, a fuel cell is a device that converts the energy of a chemical reaction into electricity. Specifically, a fuel cell releases electrons by bringing a fuel and an oxidant into contact with an electrolyte sandwiched between two electrodes. Hydrogen ($H_2$) is commonly used as fuel and air is commonly used as an oxidant for fuel cells, and water is produced as a byproduct. For example, a proton exchange membrane (PEM) fuel cell includes a PEM as the electrolyte sandwiched between two gas diffusion electrodes and is operated in a convection or forced convection mode. Fuel cells are seldom operated as single units, rather, many single units are connected in series to produce a larger electromotive force to be of practical value. A series of fuel cells are referred to as a fuel cell stack.

The typical operation of a fuel cell involves providing fuel at a first electrode where it reacts electrochemically in the presence of an electrolyte to produce electrons and protons in the first electrode. The electrons are circulated from the first electrode to a second electrode through an electric circuit connected between the electrodes. Protons pass through the electrolyte to the second electrode. Simultaneously, an oxidant, such as oxygen gas or air, is provided to the second electrode where the oxidant reacts electrochemically in the presence of the electrolyte consuming the electrons circulating through the electric circuit and the protons of the second electrode. The external electric circuit withdraws electrical current and thus receives electrical power from the cell.

Fuel cell stacks may be categorized based on various features and functions, such as the technique of mixing fuel with oxidant, the kind of fuel employed, the type of electrolyte, etc. Some fuel cell stacks utilize a liquid electrolyte while others use a solid electrolyte. When a solid electrolyte is employed, the electrolyte is typically kept moist with a liquid such as water, as the electrolyte will not work efficiently when it is dry. For example, when a solid polymer electrolyte, such as the PEM, is used in a fuel cell, the fuel cell operates best when the PEM is kept moist with water.

For a portable power system utilizing a fuel cell stack, it is desirable to procure the oxidant air directly from the atmosphere. It is also desirable to have the air fed to the fuel cell stack by natural convection to avoid any loss of energy to do the work of feeding the air into the stack. The convection mode of operation does not require additional power consumption for the entry of air and does not require additional compression auxiliaries. In this mode of operation, the fuel cell breathes in the air and oxidizes the hydrogen releasing electrons for the generation of electricity. Such a fuel cell can thus be ordinarily referred to as a convection or air-breathing fuel cell. In the convection stack, the flow of hydrogen fuel is forced from cell to cell. The flow of hydrogen fuel can be maintained dead-ended, meaning that all the hydrogen entering the stack is utilized by the stack, or the hydrogen can be recycled with the help of a suitable recirculating pump.

Fuel cells typically contain a plurality of anode and cathode channels that provide for the flow of fuel and oxidant. Some fuel cells are constructed with bipolar plates having channels that run parallel up and down the bipolar plate. For natural convection of air to take place through the flow channels, the channels are parallel and are positioned vertically within the bipolar plate. During the operation of such a convection stack, most of the water produced in the fuel cell exits through the channels. Depending on the dimensions of the channels and cell temperature, a portion of the condensed water drains down the channels through the bottom of the cell and a portion evaporates as water vapor. A portion may also remain in the channel partially blocking the channel. If such a blockage occurs, the convection of air through the channel is impeded resulting in a loss of cell performance. On the other hand, at a higher temperature, most of the water exits as vapor through the top of the fuel cell. The blockage of channels or the excessive evaporation causes unstable output from the fuel cell stack.

Therefore, there is a need for a fuel cell with no requirements for humidification or for one that has means to ensure proper humidity. A related problem is one of reducing the blockage of the channels of a fuel cell due to condensation of liquid. Therefore, there is also the need to remove excess condensed liquid while ensuring adequate humidity for its operation. In addition, there is a need to selectively increase the residence time of oxidant in the channels so as to increase its percentage of utilization contributing to increased cell performance. Finally, there is a need to provide for the stable operation of the fuel cell over a range of operational temperatures.

SUMMARY OF THE INVENTION

A fuel cell according to the present invention employs a flow facilitator for draining condensed liquid, maintaining proper humidification, and increasing the residence time of oxidant in the cathode channels of the fuel cell.

The fuel cell includes an electrode assembly, a cell assembly mounted to the electrode assembly forming an anode and at least one cathode channel, and a flow facilitator located within the cathode channel. In an exemplary embodiment, each cathode channel of the fuel cell is substantially straight and includes upper and lower openings and the flow facilitator extends between the upper and lower openings of each cathode channel. The flow facilitator is preferably placed obliquely within each cathode channel.

The flow facilitator may be a thread made of any one or any combination of cotton, silk, fiberglass, nylon, polyester or the like. In the exemplary embodiment, the flow facilitator is a thread coated with polytetraflouroethylene. Also, the flow facilitator may comprise a plurality of threads weaved between and through the plurality of cathode channels in a crisscross pattern.

The flow facilitator functions as a wick during the operation of the fuel cell to drain fluid from each cathode channel where it is placed. Furthermore, the flow facilitator provides resistance to water vapor flow within each cathode channel during the operation, thereby increasing humidification of the fuel cell. Moreover, the flow facilitator increases the residence time of oxidant within each cathode channel during the operation of the fuel cell.

In the preferred embodiment of the present invention, the cell assembly forms a plurality of cathode channels and the flow facilitator is a single thread weaved between and through each of the cathode channels of the fuel cell. Alternatively, the flow facilitator comprises a plurality of threads, each placed within a corresponding one of the plurality of cathode channels.

A fuel cell stack, according to the present invention, includes a plurality of bipolar plates that are stacked together, each plate including a plurality of rib extensions and cathode channels. The fuel cell stack also includes a plurality of electrode assemblies, each inserted and mounted between adjacent bipolar plates to form fuel cell layers. Each fuel cell layer includes an anode layer on one side of each electrode assembly and several of the cathode channels on another side of each electrode assembly. The fuel cell stack also includes a flow facilitator located in a subset of the plurality of cathode channels. Of course, the subset may include all of the cathode channels for maximal efficiency.

The flow facilitator of the fuel cell stack is preferably a thread weaved between and through the cathode channels. Furthermore, each of the plurality of cathode channels are substantially straight and include an upper end and a lower end, where the flow facilitator is weaved obliquely within the cathode channels between the upper and lower ends. A fan may be placed at the lower end of the fuel cell stack to blow air into each of the plurality of cathode channels for forced convection operation.

A method of making a fuel cell stack according to the present invention includes steps of stacking a plurality of bipolar plates and electrode assemblies together to form a plurality of cathode channels and fuel cell layers, and weaving a flow facilitator between and within each of the plurality of cathode channels. The weaving step may comprise a step of weaving a thread to be obliquely placed within each of the cathode channels.

It is now appreciated that a flow facilitator according to the present invention improves operation of a fuel cell. A flow facilitator contributes to increased cell performance by reducing blockage of the channels, removing excess condensed liquid while ensuring adequate humidity, increasing the residence time of oxidant in the channels for increased utilization, and provides for the stable operation over a range of operational temperatures.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1A:
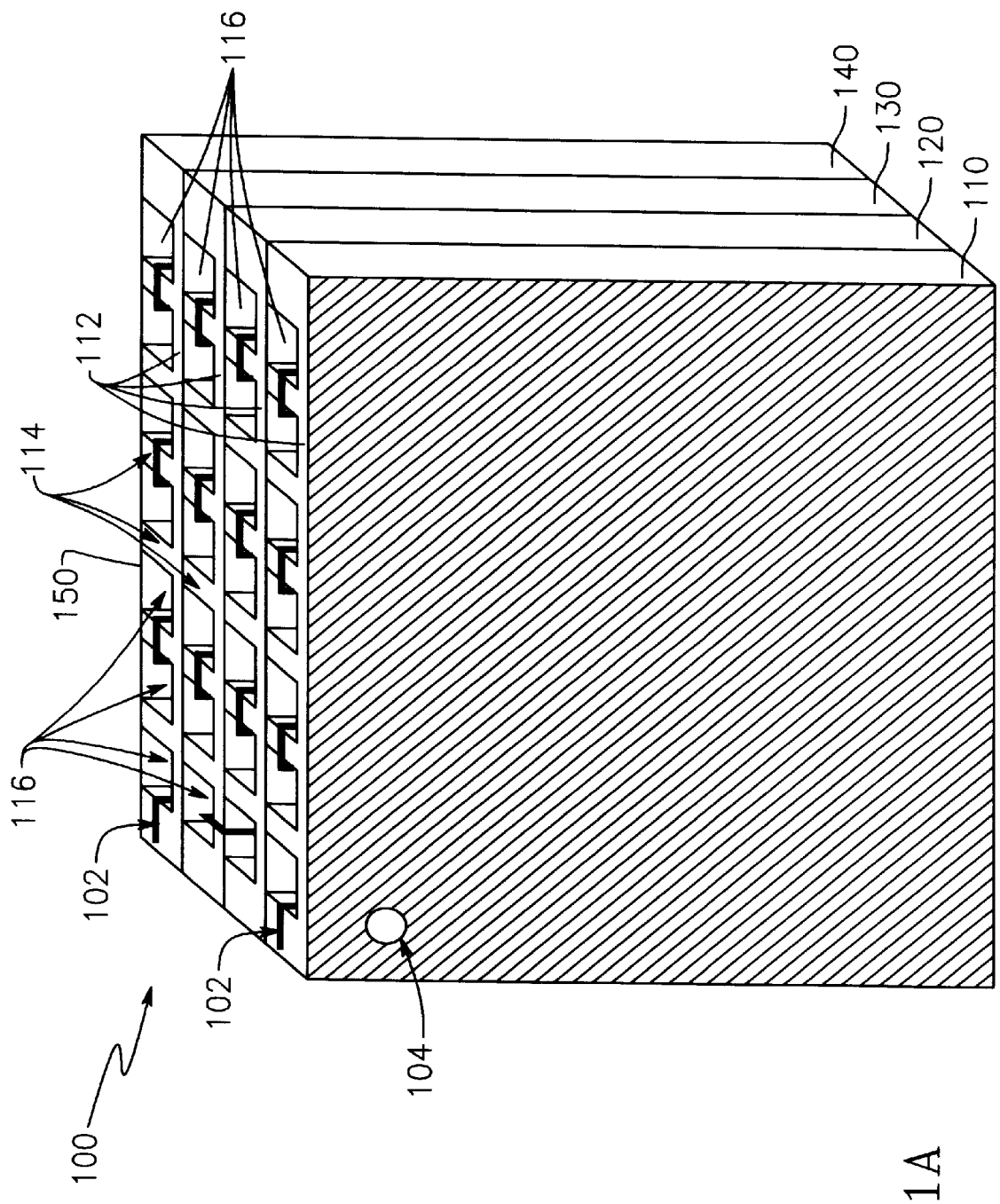
FIG. 1A is a simplified perspective view of a fuel cell stack with a flow facilitator that is weaved through a plurality of cathode channels.

FIG. 1A is a simplified perspective view of a fuel cell stack 100 with a flow facilitator 102 implemented according to the present invention. The fuel cell stack 100 has four similar bipolar plates 110, 120, 130 and 140 stacked together such that they are all aligned in the same manner with one bipolar plate physically next to an adjacent one. Preferably, gold-plated metal end plates (not shown) are placed at both ends to complete the stack assembly. An inlet 104 is provided on the bipolar plate 110 for injection of hydrogen ($H_2$) into the fuel cell stack 100. Each of the bipolar plates 110–140 preferably comprises graphite or the like, and is relatively flat and includes several ribs 114 and channels 116 formed therein. Each of the cathode channels 116 are preferably substantially straight for efficient convection operation. It is noted, however, that alternative structures are contemplated so that cathode channels may have any desired cross-sectional geometric shape, such as a parallelogram or any polygonal shape, a circle, an oval or any curvilinear shape, etc. The bipolar plates 110, 120, 130, 140 are stacked together in a parallel configuration with the ribs 114 generally aligned with each other as shown. For example, the bipolar plates 110–140 are aligned so that the ribs 114 of the bipolar plates 110–140 are aligned coplanar with the ribs 114 of the other bipolar plates.

Figure 1B:
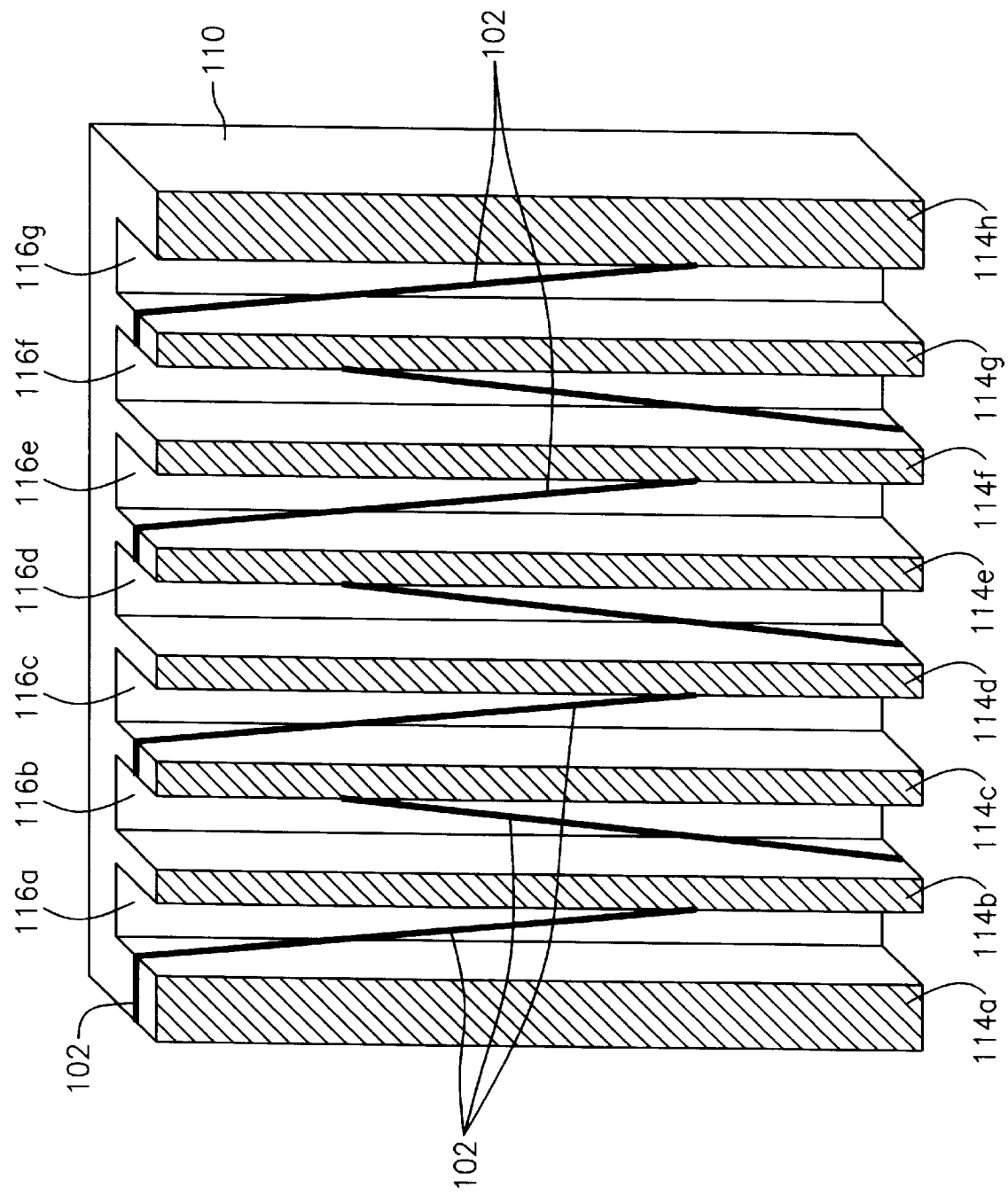
FIG. 1B is a perspective view of a single bipolar plate of the fuel cell stack of FIG. 1A showing exemplary threading of a flow facilitator through the channels.

FIG. 1B is a perspective view of the bipolar plate 110 showing exemplary threading of the flow facilitator 102. The bipolar plate 110 includes eight (8) consecutive ribs 114a, 114b, 1140c, 114d, 114e, 114f, 114g and 114h partially defining seven consecutive channels 116a, 116b, 116c, 116d, 116e, 116f and 116g. The ribs 114a and 114h are the outer ribs of the bipolar plate 110. As shown, the flow facilitator 102 is a thread that is weaved from the top of the first rib 114a to the bottom of the adjacent rib 114b. The flow facilitator 102 is then wrapped around the bottom of the rib 114b, is weaved to the top of the next rib 114c and wrapped around the rib 114c. This weaving process is repeated until all the channels 116a–g of the bipolar plate 110 are weaved. The flow facilitator 102 is attached in any one of several different methods. For example, the flow facilitator 102 may be tied at either end or secured using any suitable adhesive. By weaving from the top of one rib 114 to the bottom of the next, the flow facilitator 102 diagonally traverses each of the channels 116a–g as shown in FIG. 1B. The flow facilitator 102 is then weaved in a similar manner through the channels 116 of an adjacent bipolar plate, such as the bipolar plate 120, and then through the remaining channels 116 of all the remaining bipolar plates as shown in FIG. 1A. In this manner, the flow facilitator 102 is weaved obliquely within each of the channels 116 of the fuel cell stack 100.

In the exemplary embodiment of the present invention described above with reference to FIGS. 1A and 1B, the flow facilitator 102 is weaved obliquely in the channels to diagonally traverse each channel 116. The flow facilitator 102 is preferably wrapped around the center of the upper and lower edges of each of the inside ribs 114. It is understood, however, that the flow facilitator 102 may be placed in several different ways inside the channels 116 according to any one of several different weaving patterns. For example, the flow facilitator 102 may be placed at any offset from the center of the ribs 114 and may even touch the sides of each channel 116. In an alternate embodiment, a plurality of separate flow facilitators are provided, each one obliquely placed within a corresponding one of the channels 116. However, a single piece of thread is easier to install and thus desirable from a manufacturing standpoint, although it is easier to remove a single thread if replacement is necessary. A flow facilitator according to the present invention is preferably placed in all of the channels of a fuel cell stack, although a subset of channels is also contemplated.

The material used to make the flow facilitator 102 comprises a thread made of any one or any combination of cotton, silk, fiber glass, nylon, rayon, polyester, or any other similar type of material. The flow facilitator 102 may be coated with other materials, for example, PTFE (polytetraflouroethylene), to increase its tensile strength, to affect hydrophilicity, and/or to increase its resistance to degradation, etc. It is desirable to use threads that are non-conducting and have stability in neutral or slightly acidic aqueous environment.

Figure 2B:
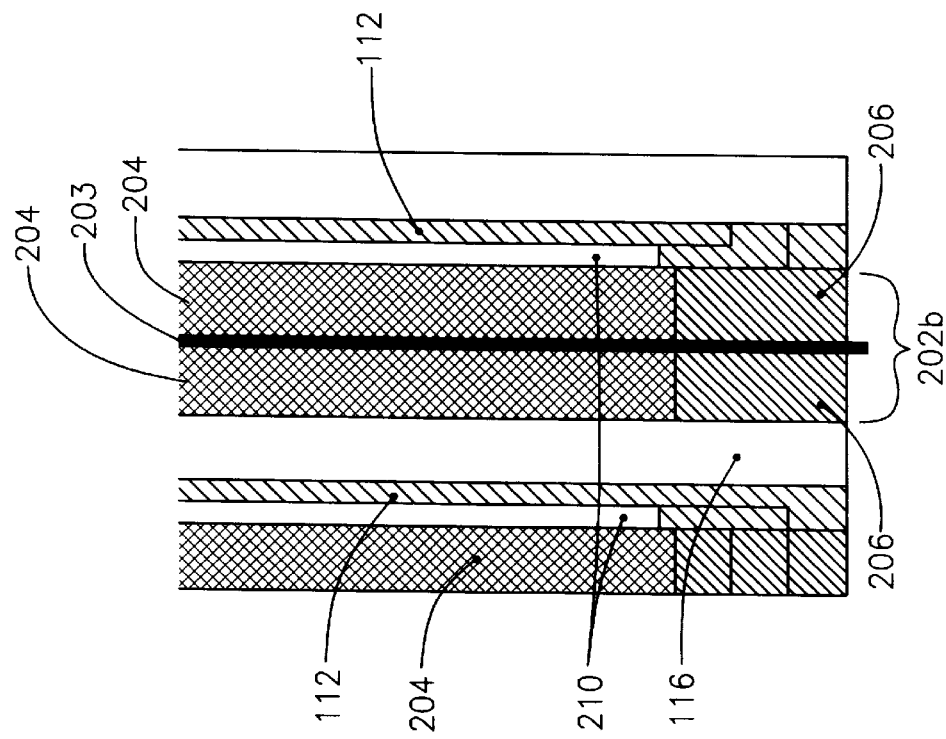
FIG. 2B is a more detailed diagram of a single fuel cell layer within the fuel cell stack of FIG. 2A.
Figure 2A:
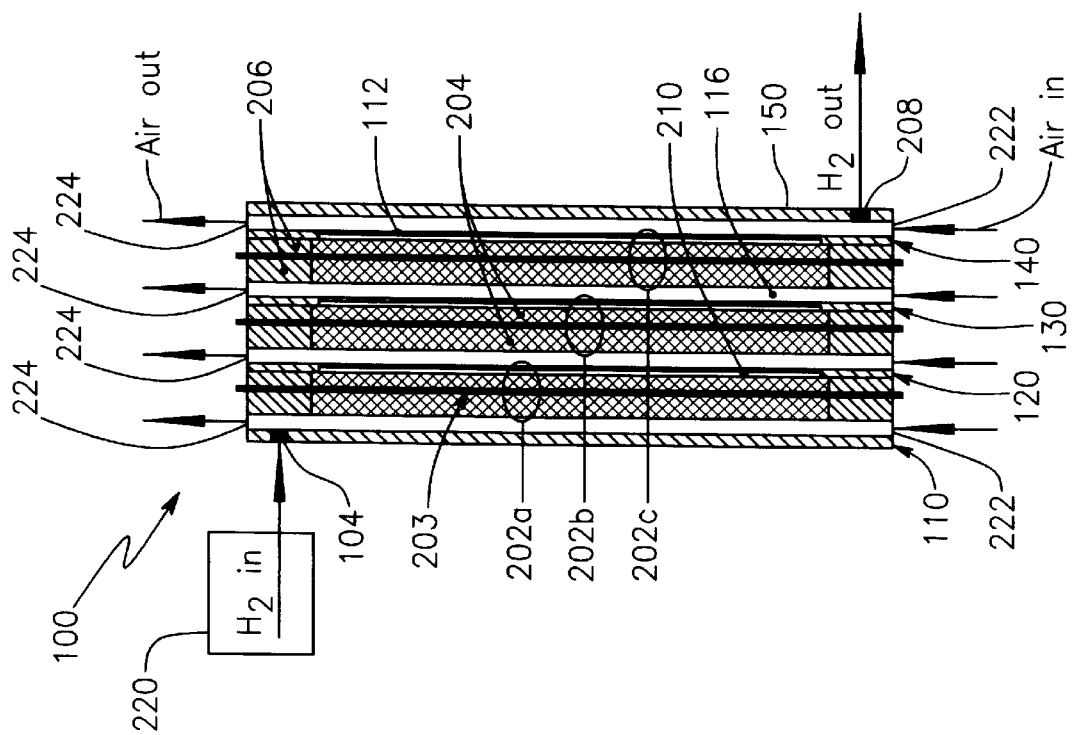
FIG. 2A is a vertical cross-sectional side view of the fuel cell stack of FIG. 1A.

FIG. 2A is a vertical cross-sectional side view of the fuel cell stack 100 of FIG. 1A. As shown in FIG. 2A, a first electrode assembly 202a is located between the bipolar plates 110 and 120, a second electrode assembly 202b is located between the bipolar plates 120 and 130, and a third electrode assembly 202c is placed between the bipolar plates 130 and 140. Each electrode assembly 202a–c is similar and is formed by bonding an electrolyte membrane 203 between two similar gas diffusion electrodes 204. Two gaskets 206 are placed about the periphery of the electrolyte membrane 203 on respective sides of each electrode assembly 202a–c and then the assembly is placed between, and bonded to, two bipolar plates. End bipolar plates (not shown) are placed adjacent to the outer bipolar plates 110 and 140 to complete the fuel cell stack 100. The bipolar plate 140 includes an outlet 208 for hydrogen. The bipolar plates 120, 130, and 140 include hydrogen flow fields 210 to direct hydrogen flow to one electrode 204 of each electrolyte assembly 202a–c to form an anode of each fuel cell layer. A channel 116 is located adjacent to the other electrode 204 to form the cathode of each fuel cell layer. In this manner, the stacked configuration of the four bipolar plates 110, 120, 130, and 140, the electrode assemblies 202a–c and the gaskets 206 form three fuel cells layers across the width of the fuel cell stack 100.

FIG. 2B is a more detailed diagram of a single fuel cell layer associated with the electrode assembly 202b of the fuel cell stack 100, which is representative of each fuel cell layer. A gas diffusion electrode 204 adjacent to a hydrogen flow field 210 serves as an anode or anode layer, permitting the hydrogen gas flowing through to come in contact with the anode side of the electrode assembly 202. Another gas diffusion electrode 204 adjacent several cathode channels 116 serves as a cathode or cathode layer, permitting air flowing through the channels 116 to come in contact with the cathode side of the electrode assembly 202. Thus, the bipolar plates 120 and 130 form a cell assembly around that electrode assembly 202b to form the fuel cell layer. The air is reduced and the hydrogen is oxidized within the fuel cell layer during the operation of the fuel cell stack 100. The gaskets 206 contact the electrodes 204 at the periphery of the assembly and serve to seal the gases within the fuel cell 200.

During the operation of the fuel cell stack 100, hydrogen is provided from a hydrogen source 220 into the inlet 104 of the first bipolar plate 110, and passed via internal hydrogen paths (not shown) of the bipolar plates 110, 120, 130 and 140 to each of the hydrogen flow fields 210. The hydrogen then exits via the hydrogen outlet 208 provided on the last bipolar plate 140. Air flows into entry openings 222 of each of the channels 116 and exits openings 224 of each of the channels 116. The gas diffusion electrodes 204 bring gaseous reactants to the reaction sites in contact with the electrolyte membrane 203. Water is produced as a byproduct of the electrochemical reaction and some of this water condenses in the channels 116.

The hydrogen flow fields 210 are connected to each other so that the hydrogen entering from the inlet 104 is circulated through all the bipolar plates 110–140 before exiting the hydrogen outlet 208. Although the fuel cell stack 100 is operated so as to maintain a dead-ended flow of hydrogen where all of it is utilized in the electrochemical reaction to produce electricity, in an alternate embodiment, any excess hydrogen that is not utilized in the fuel cell stack 100 is recycled with the help of a suitable recirculating pump (not shown).

During operation of the fuel cell stack 100, the flow facilitator 102 acts as a wick so that condensed liquid in the channels 116, such as water, flows down along the flow facilitator 102. The wicking action by the flow facilitator 102 helps to drain the liquid droplets through the bottom of the channels 116 of the fuel cell stack 100. Some of the liquid is absorbed by the flow facilitator 102 depending on its absorption capability. This absorbed liquid is beneficial for the fuel cell operation. By being obliquely placed in each of the channels 116, the flow facilitator 102 provides resistance to the flow of condensed liquid vapor, such as condensed water vapor, thereby increasing the residence time of the liquid in each channel 116 to effect humidification of each fuel cell layer. The flow facilitator 102 also increases the residence time of the oxidant in each channel 116, thereby increasing its percentage of utilization contributing to better cell performance. High surface area of the flow facilitator 102 facilitates quick equilibrium of the incoming oxidant with the liquid contained in the flow facilitator 102. The flow facilitator 102 is used to provide better flow of a fuel and an oxidant in the channels 116 of the fuel cell stack 100.

Figure 3:
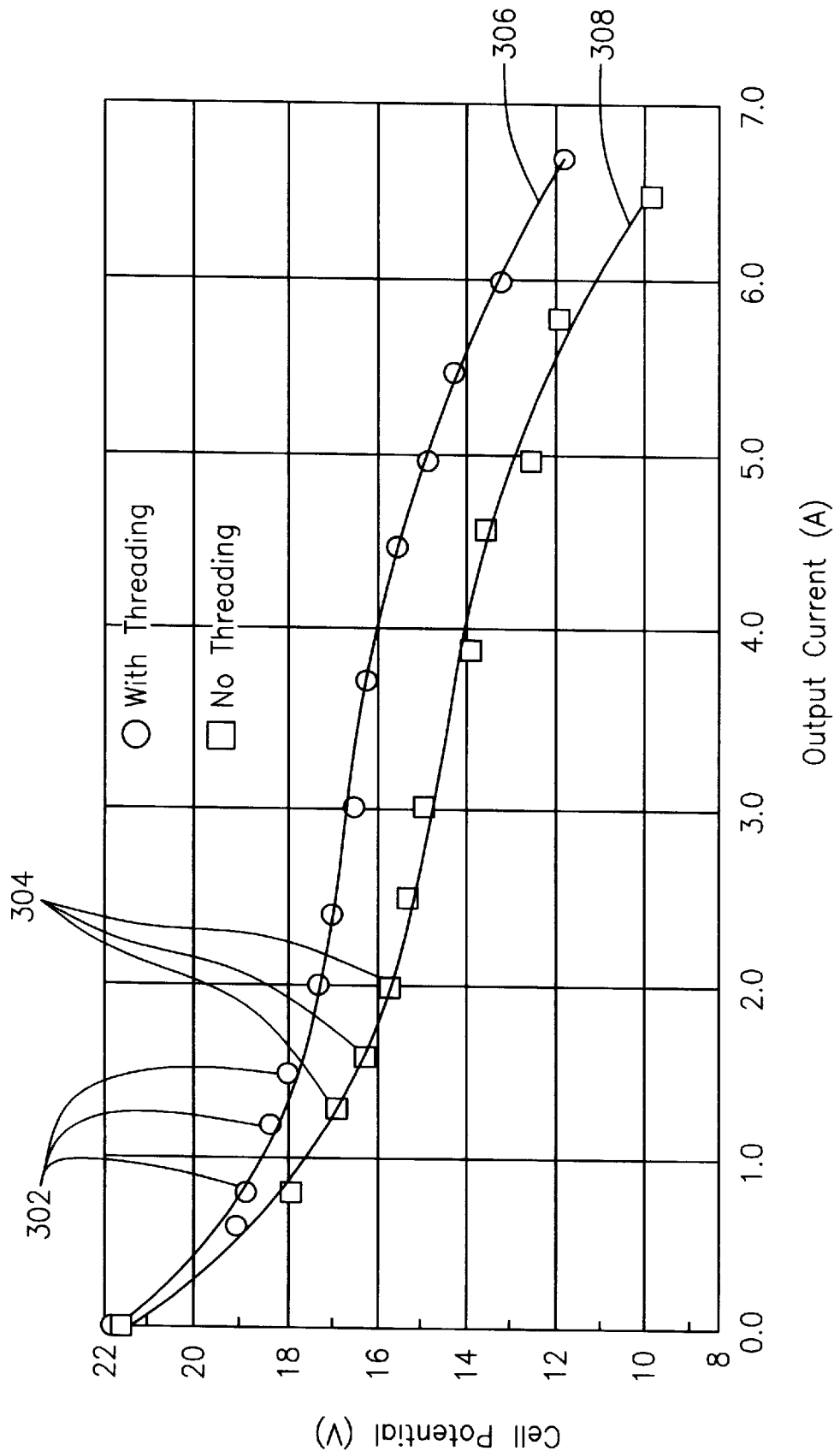
FIG. 3 is a graph of cell stack potential versus output current comparing two different fuel cells stacks, one with and the other without a flow facilitator according to the present invention.
Figure 4:
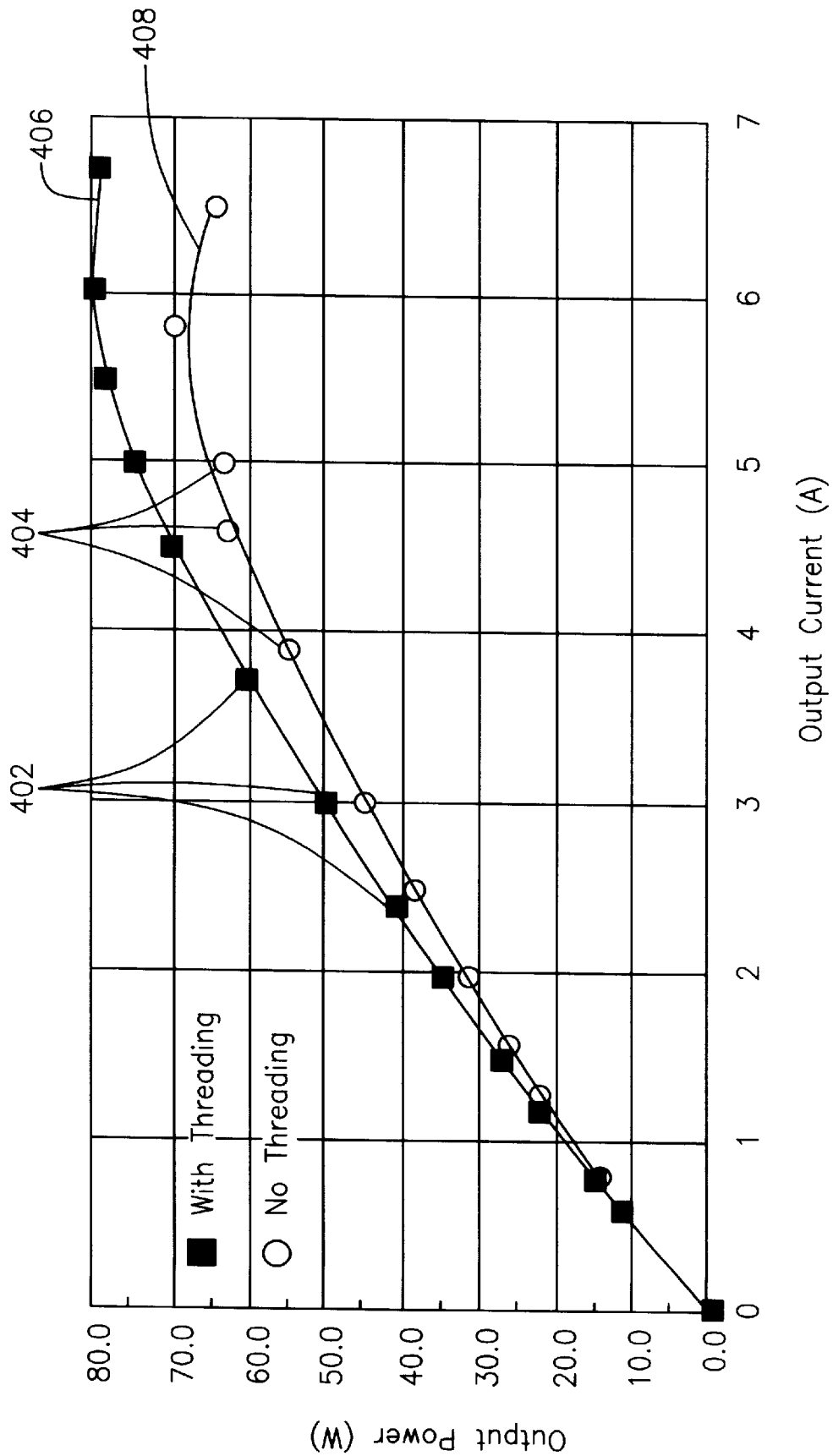
FIG. 4 is a graph of fuel cell stack output power versus output current of the two fuel cell stacks used for the graph of FIG. 3.

FIGS. 3 and 4 are graphs comparing operation of two different fuel cell stacks. In particular, a first fuel cell stack was constructed with a flow facilitator in accordance with the present invention and its performance was compared to the performance of a similar fuel-cell stack without a flow facilitator. Each fuel cell stack was assembled using 22 single cells. The active area of each stack was 25 $cm^2$. The platinum catalyst loading on the cathode side was 4 mg. $cm^{-2}$, and the loading on the anode side was 2 mg.$cm^{-2}$. The electrolyte was Nafion 112. The cathode side of each cell had 13 parallel channels for the oxidant air. The membrane-electrode assemblies were prepared by procedures described by Dhar in U.S. Pat. Nos. 5,242,764 and 5,521,020, which are hereby incorporated by reference in their entirety. The channels of the first stack were threaded with the flow facilitator in a similar manner as described above for FIGS. 1A and 1B. The flow facilitator used was a nylon thread of 0.007 inches diameter, which comprised multiple filaments of nylon twisted into a rope form. This particular embodiment is introduced to illustrate further the novelty and utility of the present invention but not with the intent of unduly limiting the same.

FIG. 3 is a graph of cell potential versus output current collected during operation of both stacks. Both fuel cell stacks were operated self-humidified, that is, no additional humidification was required for operation. Both stacks were operated by convection, where the oxidant air entered each stack at the bottom by natural convection through the parallel channels. The X-axis shows current in amperes in the range of 0.0 amperes (A) to 7.0 A. The Y-axis shows the cell potential voltage in volts, in the range of 8 volts (V) to 22 V. Circles and squares on the graph are plotted points and correspond to actual measurements. In particular, circular points 302 on the graph identify data measurements of the first stack with the flow facilitator and square points 304 identify data measurements of the second stack without a flow facilitator. Curves 306 and 308 are estimation curves drawn through corresponding points 302, 304, respectively, plotted on the graph. Specifically, the curve 306 joins consecutive points 302 and the curve 308 joins consecutive points 304. During the period of a set of data collection, the stack temperature increased from about 40 Celsius (°C.) to about 65° C. Approximately 3 minutes time was allowed for equilibrium of temperature for each data point. The graph of FIG. 3 clearly illustrates that the fuel-cell stack performs better with a flow facilitator according to the present invention, and delivers more current for a given voltage setting than a fuel-cell stack constructed in an equivalent manner but without a flow facilitator.

FIG. 4 is a graph of corresponding output power versus output current during operation of the first and second stacks. The X-axis shows current in amperes(A) in the range of 0.0 A to 7.0 A. The Y-axis shows the power output in watts (W), in the range of 0.0 W to 80.0 W. Square points 402 on the graph identify data measurements of the first stack with the flow facilitator and circular points 404 identify data measurements of the second stack without a flow facilitator. Curves 406 and 408 are estimation curves drawn through corresponding points 402, 404, respectively, plotted on the graph. Specifically, the curve 406 joins adjacent points 402 and the curve 408 joins adjacent points 404. FIG. 4 clearly illustrates that a fuel-cell stack with a flow facilitator according to the present invention performs better by delivering more power for a given current setting.

FIGS. 3 and 4 illustrate that the performance of a fuel cell stack is significantly greater with a flow facilitator according to the present invention. About 20% greater power was obtained at the current output of about 5 amperes from the stack. The output power of a stack including a flow facilitator was observed to be more stable during continuous fuel cell operation.

Figure 5:
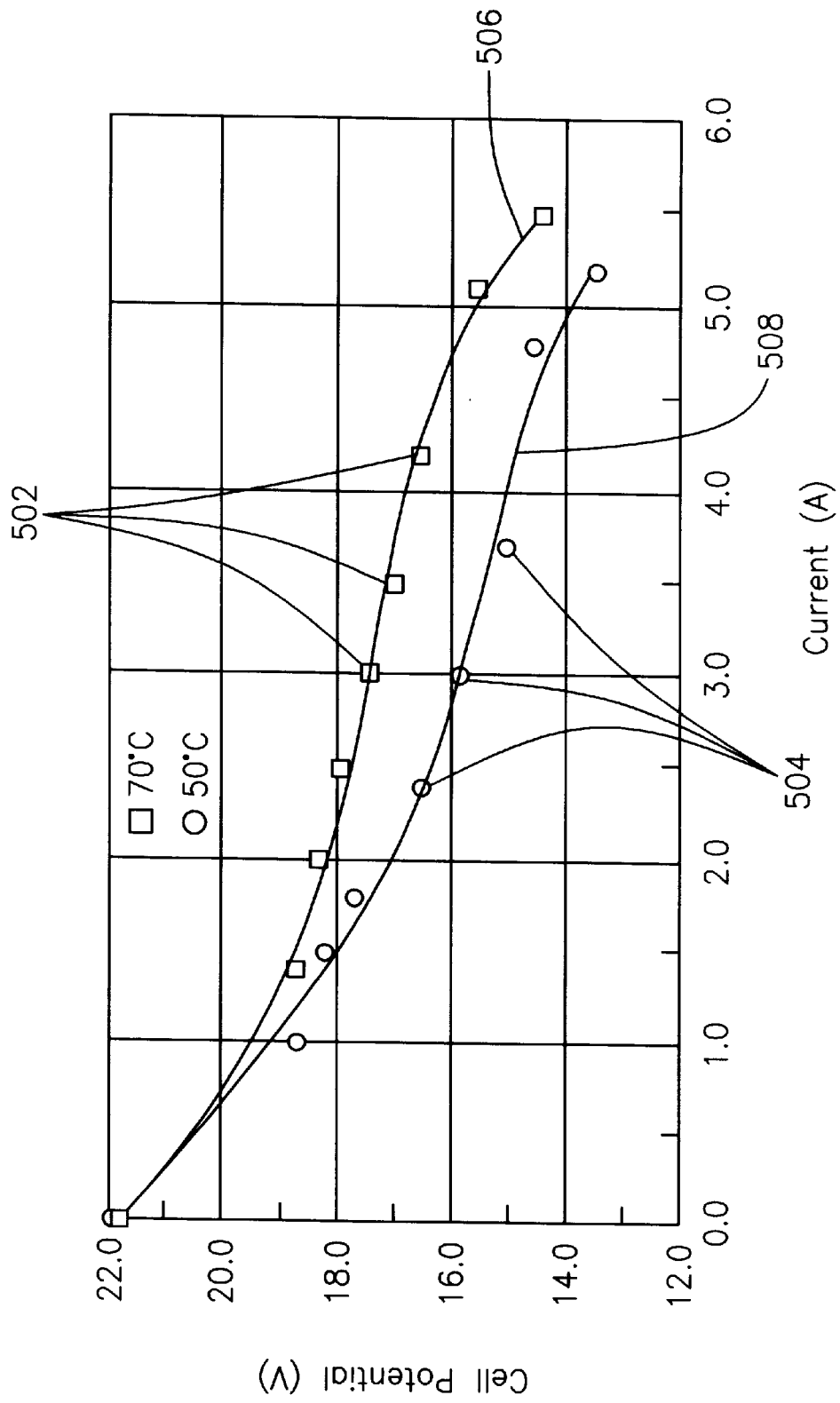
FIG. 5 shows the effect of temperature on the performance of a fuel cell stack implemented according to the present invention.

FIG. 5 shows the effect of temperature on the performance of a fuel cell stack including a flow facilitator implemented according to the present invention. In this case, the experiment was performed with the first stack used for FIGS. 3 and 4 above. The cell potential versus output current were obtained at the two temperatures 50 and 70 degrees °C. The X-axis shows current in amperes (A) in the range of 0.0 amps to 6.0 A, and the Y-axis shows the cell potential in volts (V) in the range of 12 V to 22 V. The temperature variation during the period of data collection was about ±2° C. A curve 506 joins square points 502 corresponding to data collected at the higher temperature of 70° C., while a curve 508 joins circular points 504 corresponding to data collected at the lower temperature of 50° C. Adequate temperature effect was observed in the performance data indicating that even without humidification, the fuel cell stack behaved normally. Usually, when the cell is not humidified, the temperature effect is small, particularly above 65° C. FIG. 5 illustrates that a fuel cell stack according to the present invention exhibits stable and acceptable behavior at higher temperatures, and thus may be operated at higher temperatures as compared to conventional fuel cell stacks.

Figure 6:
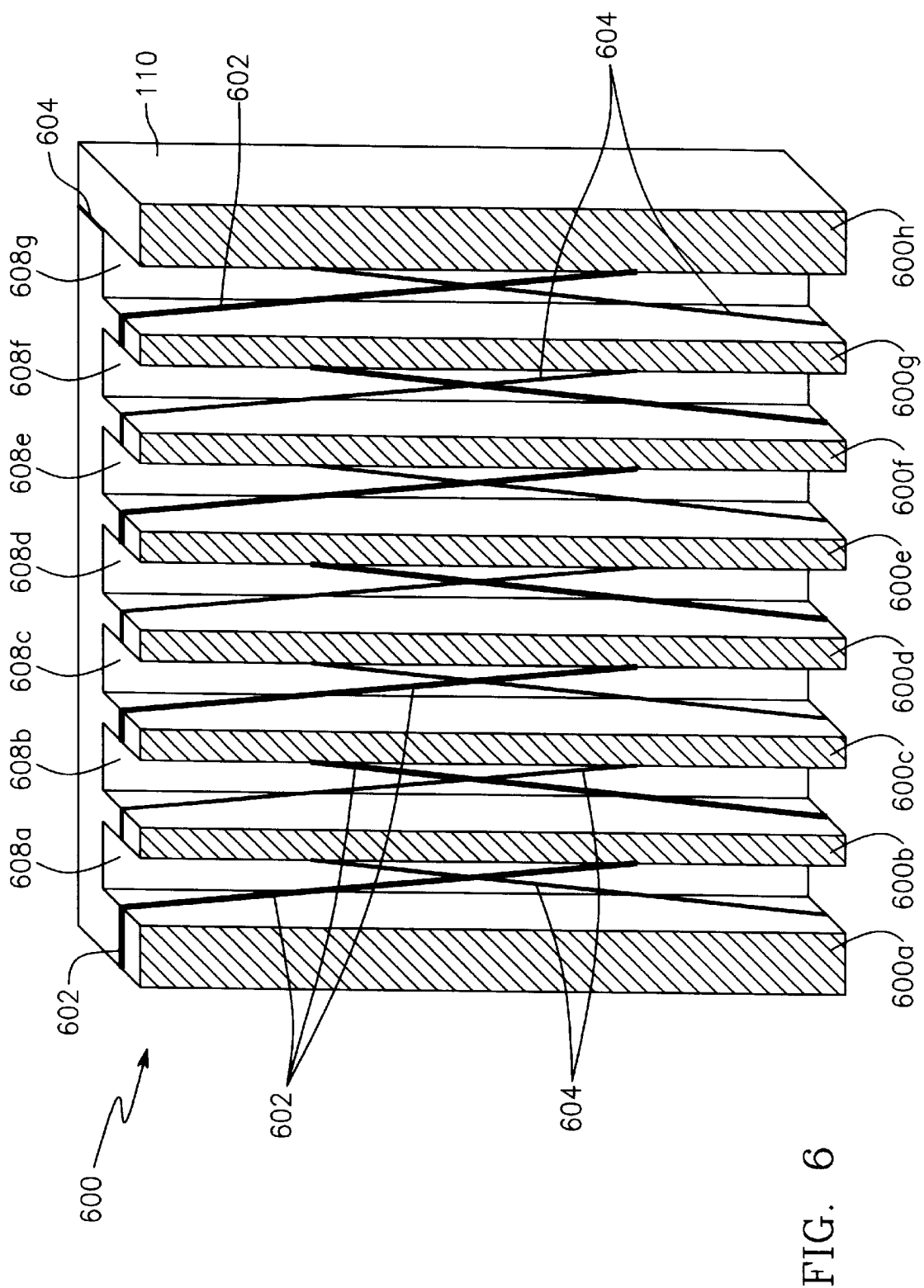
FIG. 6 is a perspective view of a bipolar plate of a fuel cell including multiple flow facilitators.

FIG. 6 is a perspective view of a bipolar plate 600 of a fuel cell stack (not shown), which is similar to the fuel cell stack 100 of FIG. 1A, except including multiple fuel flow facilitators. The bipolar plate 600 illustrates an alternative embodiment of the present invention, in which two flow facilitators 602 and 604 are weaved in the channels 608 of the bipolar plate 600 rather than a single one. The bipolar plate 600 includes eight (8) consecutive ribs 600a, 600b, 600c, 600d, 600e, 600f, 600g and 600h defining seven consecutive channels 608a, 608b, 608c, 608d, 608e, 608f and 608g. The flow facilitator 602 is weaved in a similar manner as described above for the flow facilitator 102. The flow facilitator 604 is also weaved in a similar but beginning at the opposite end of each channel 608, beginning at the bottom of the first rib 600a to the top of the next rib 600b to the bottom of the next rib 600c, etc. By weaving diagonally and in opposite manner, the flow facilitators 602, 604 form a crisscross pattern within each of the channels. Of course, three or more weaved flow facilitators are contemplated. It is noted, however, that too many flow facilitators appreciably block the channels of the stack resulting in depreciated performance.

Figure 7:
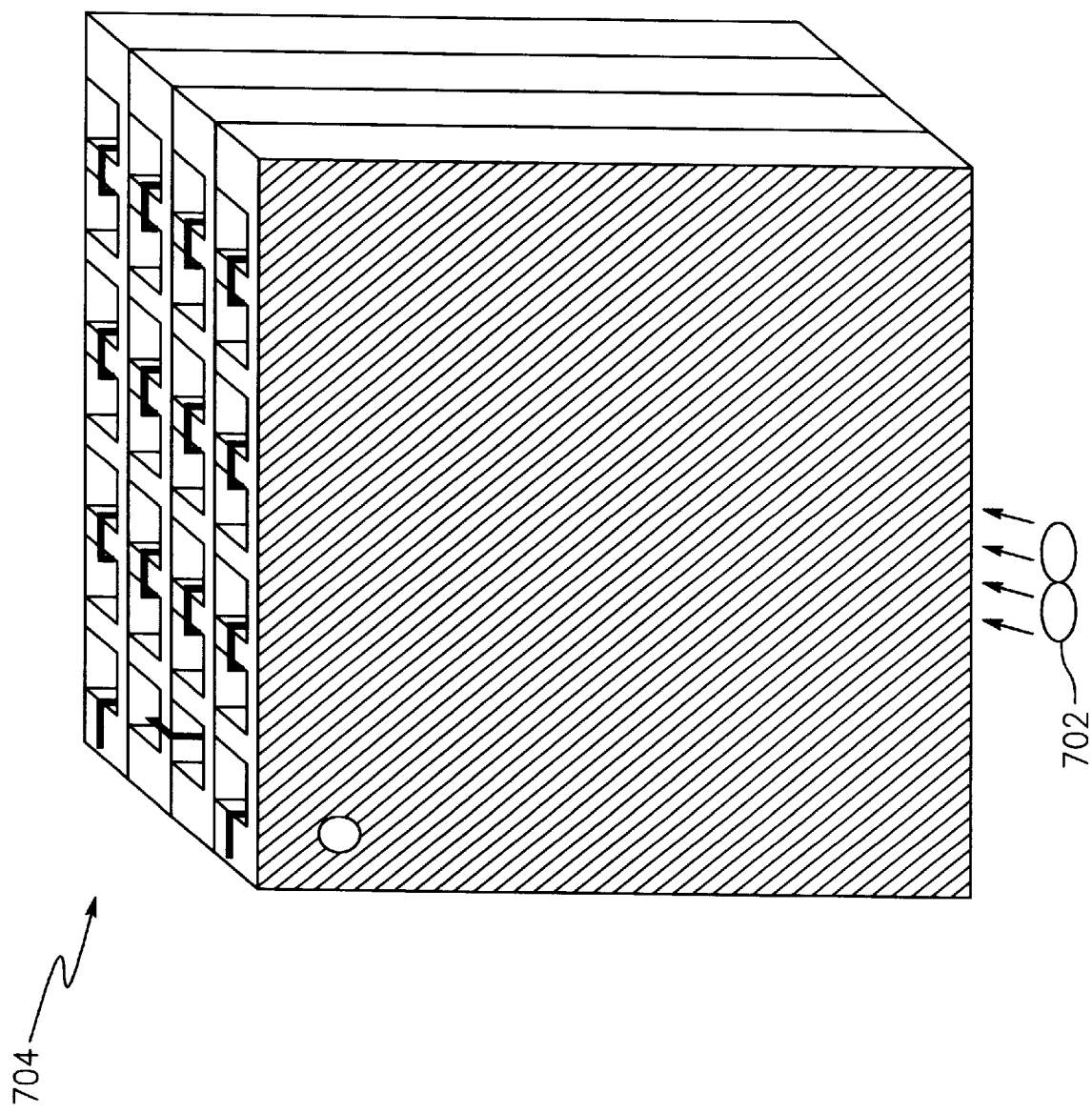
FIG. 7 is a simplified perspective view of a fuel cell stack according to the present invention including a fan for forced convection operation.

If a greater amount of power is required from a convection stack, a small fan is used at the bottom or top of the stack to induce a forced convection of air into the stack channels. As shown in FIG. 7, a fan 702 is placed at the bottom of a fuel cell stack 704 implemented according to the present invention. The fan 702 is connected to the output of the fuel cell stack 704 and consumes about 1–5% of the produced power. In return, the overall power output of the stack 704 may be increased between 50–100%. Under the forced convection, it is desired to maintain the water balance of the fuel cell stack for its continuous operation. If the humidity is not sufficient, the humidity is supplied by employing appropriate instrumentation.

It is now appreciated that a flow facilitator according to the present invention has a dramatic effect on the operation of a fuel cell stack. Firstly, a flow facilitator improves the fuel cell operation. Secondly, it makes operation possible at higher temperatures. Thirdly, it facilitates the removal of condensed liquid through the bottom of the stack. Fourthly, a better control of convection of oxidant and a better exit of condensed liquid vapor is achieved using a flow facilitator. Finally, a desirable flow turbulence is introduced into the stack.

Although a system and method according to the present invention has been described in connection with specific embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A fuel cell, comprising:
   an electrode assembly;
   a cell assembly mounted to said electrode assembly forming an anode and at least one cathode channel; and
   a flow facilitator filament located within said at least one cathode channel.

2. The fuel cell of claim 1, further comprising:

said at least one cathode channel being substantially straight and including upper and lower openings; and wherein said flow facilitator filament extends between said upper and lower openings of said at least one cathode channel.

3. The fuel cell of claim 2, wherein said flow facilitator filament is placed obliquely within said at least one cathode channel.

4. The fuel cell of claim 1, wherein said flow facilitator filament comprises a thread primarily made of cotton, silk, fiberglass, nylon or polyester.

5. The fuel cell of claim 1, wherein said flow facilitator filament comprises a thread coated with polytetraflouroethylene.

6. The fuel cell of claim 1, wherein said flow facilitator filament functions as a wick during operation of the fuel cell to drain fluid from said at least one cathode channel.

7. The fuel cell of claim 1, wherein said flow facilitator filament provides resistance to water vapor flow within said at least one cathode channel during operation of the fuel cell to increase humidification.

8. The fuel cell of claim 1, wherein said flow facilitator filament increases residence time of oxidant within said at least one cathode channel during operation of the fuel cell.

9. The fuel cell of claim 1, wherein said flow facilitator filament comprises a plurality of threads placed within said at least one cathode channel in a crisscross pattern.

10. The fuel cell of claim 1, further comprising:

said cell assembly forming a plurality of cathode channels adjacent said electrode assembly.

11. The fuel cell of claim 10, further comprising:

said flow facilitator filament comprising a single thread weaved to and within each of said plurality of cathode channels.

12. The fuel cell of claim 10, further comprising:

said flow facilitator filament comprising a plurality of threads, each placed within a corresponding one of said plurality of cathode channels.

13. A fuel cell stack, comprising:

a plurality of bipolar plates stacked together;

a plurality of electrode assemblies, each inserted and mounted between adjacent ones of said stacked bipolar plates to form a plurality of fuel cell layers, each fuel cell layer including an anode layer on one side of each electrode assembly and at least one cathode channel on another side of each electrode assembly, the plurality of fuel cell layers including a plurality of cathode channels; and a flow facilitator filament located in at least one of said plurality of cathode channels.

14. The fuel cell stack of claim 13, wherein said flow facilitator filament comprises a thread weaved between and through said at least one of said plurality of cathode channels.

15. The fuel cell stack of claim 14, further comprising:

each of said plurality of cathode channels being substantially straight and including an upper end and a lower end; and wherein said flow facilitator filament is weaved obliquely within each of said at least one of said plurality of cathode channels between said upper and lower ends.

16. The fuel cell stack of claim 15, further comprising:

a fan located at the lower end of and for blowing air into each of said plurality of cathode channels for forced convection operation.

17. The fuel cell stack of claim 13, wherein said flow facilitator filament comprises a thread primarily made of cotton, silk, fiberglass, nylon or polyester.

18. The fuel cell stack of claim 13, wherein said flow facilitator filament comprises a thread coated with polytetraflouroethylene.

19. The fuel cell stack of claim 13, wherein said flow facilitator filament comprises a plurality of threads weaved between and through said at least one of said plurality of cathode channels in a crisscross pattern.

20. A method of making a fuel cell stack, comprising steps of:

stacking a plurality of bipolar plates and electrode assemblies together to form fuel cell layers, where each bipolar plate includes at least one cathode channel; and weaving a flow facilitator filament between and within each cathode channel.

21. The method of claim 19, wherein said weaving step comprises a step of weaving a thread to be obliquely placed within each cathode channel.

* * * * *